United States Patent [19]

Rosell

[11] 4,128,046

[45] Dec. 5, 1978

[54] POWER STEERING MECHANISM

[75] Inventor: Jorge E. Rosell, Barcelona, Spain

[73] Assignee: Bendiberica, S. A., Barcelona, Spain

[21] Appl. No.: 757,809

[22] Filed: Jan. 7, 1977

[51] Int. Cl.² ............................ F15B 9/10; F16J 11/02
[52] U.S. Cl. ...................................... 91/375 A; 92/128;
 92/164; 92/DIG. 1
[58] Field of Search ...................... 91/375 A, 375 R;
 92/128, 169, 164, DIG. 1

[56] References Cited

U.S. PATENT DOCUMENTS

| | | | |
|---|---|---|---|
| 3,033,051 | 5/1962 | Reinke et al. | 91/375 A |
| 3,741,074 | 6/1973 | Oxley et al. | 91/375 A |
| 3,896,702 | 7/1975 | Shah et al. | 91/375 A |

FOREIGN PATENT DOCUMENTS

| | | | |
|---|---|---|---|
| 1405611 | 9/1975 | United Kingdom | 91/375 A |

*Primary Examiner*—Paul E. Maslousky
*Attorney, Agent, or Firm*—Paul David Schoenle; Ken C. Decker

[57] ABSTRACT

A power steering mechanism for a vehicle which comprises a rotary steering control member and a driving piston connected to a member in the steering gear of the vehicle. The piston separates two pressure chambers in the housing. The mechanism also comprises a shaft of which the first end defines a screw cooperating with a nut attached to the piston. A pressure fluid distribution valve is adapted to control fluid communication between the pressure source formed by a pump, and the two pressure chambers. The distribution valve is of the rotary type and comprises a sleeve moving as a whole with the rotary control member and a rotor moving in unison with the shaft. The shaft and the rotor are connected to opposite ends of a torsion bar. The second end of the shaft is broadened and contains a bore. This other end is provided with orifices and defines the sleeve of the rotary valve, in which the rotor is mounted for rotation. The second end of the shaft is rotatably mounted in the housing by means of a single ball thrust bearing which is constructed as follows: the inner ball race is a groove in the outer periphery of said second end. The outer ball race is formed on two complementary rings held axially and radially in the valve cover of the housing.

6 Claims, 5 Drawing Figures

POWER STEERING MECHANISM

The invention relates essentially to a power steering mechanism for vehicles, of the type comprising a rotary-type distributor valve for hydraulic pressure fluid.

Known power steering mechanisms, as disclosed in particular in U.S. Pat. No. 3,022,772 comprise in a housing a rotary steering control member, a driving piston connected to a member in the steering gear of the vehicle, the piston separating two pressure chambers in the housing, a shaft of which one end comprises a screw cooperating with a nut attached to the piston, a pressure fluid distributor valve connected to the two pressure chambers, the distributor valve being of the rotary type comprising a sleeve moving in unison with the shaft and a rotor moving in unison with the rotary control member, the shaft and the rotary control member being connected to opposite ends of a spring forming a torsion bar.

Although these known power steering mechanisms operate satisfactorily, they have a highly complex design in respect of the actual distributor valve, and this makes them both bulky and expensive to produce. A prime object of the invention is to propose a power steering mechanism with as few parts as possible, so as to reduce both its bulk and its manufacturing cost.

According to the invention, the other end of the shaft widens out, contains a bore and is provided with orifices to contain the sleeve and the rotor of the distributor valve, and the shaft is rotatably mounted in the housing by means of a single ball thrust bearing which is constructed as follows: the inner ball race is a groove in the outer periphery of the said other end of the shaft, and the outer ball race is formed on two complementary rings held axially and radially in the valve cover of the housing.

In order to make the power steering even more convenient to install in a vehicle, the valve cover of the housing comprises a fluid inlet orifice and a fluid outlet orifice, the orifices lead respectively to an annular inlet compartment and an annular outlet compartment which enable fluid to flow through the distributor valve, the cover being attached to the body of the housing by identical fixing means spaced regularly around the periphery of the cover so that the angular orientation of the inlet and outlet orifices relative to the body of the housing can be modified.

The invention will now be described with reference to the accompanying drawings, in which.

Figure 1:
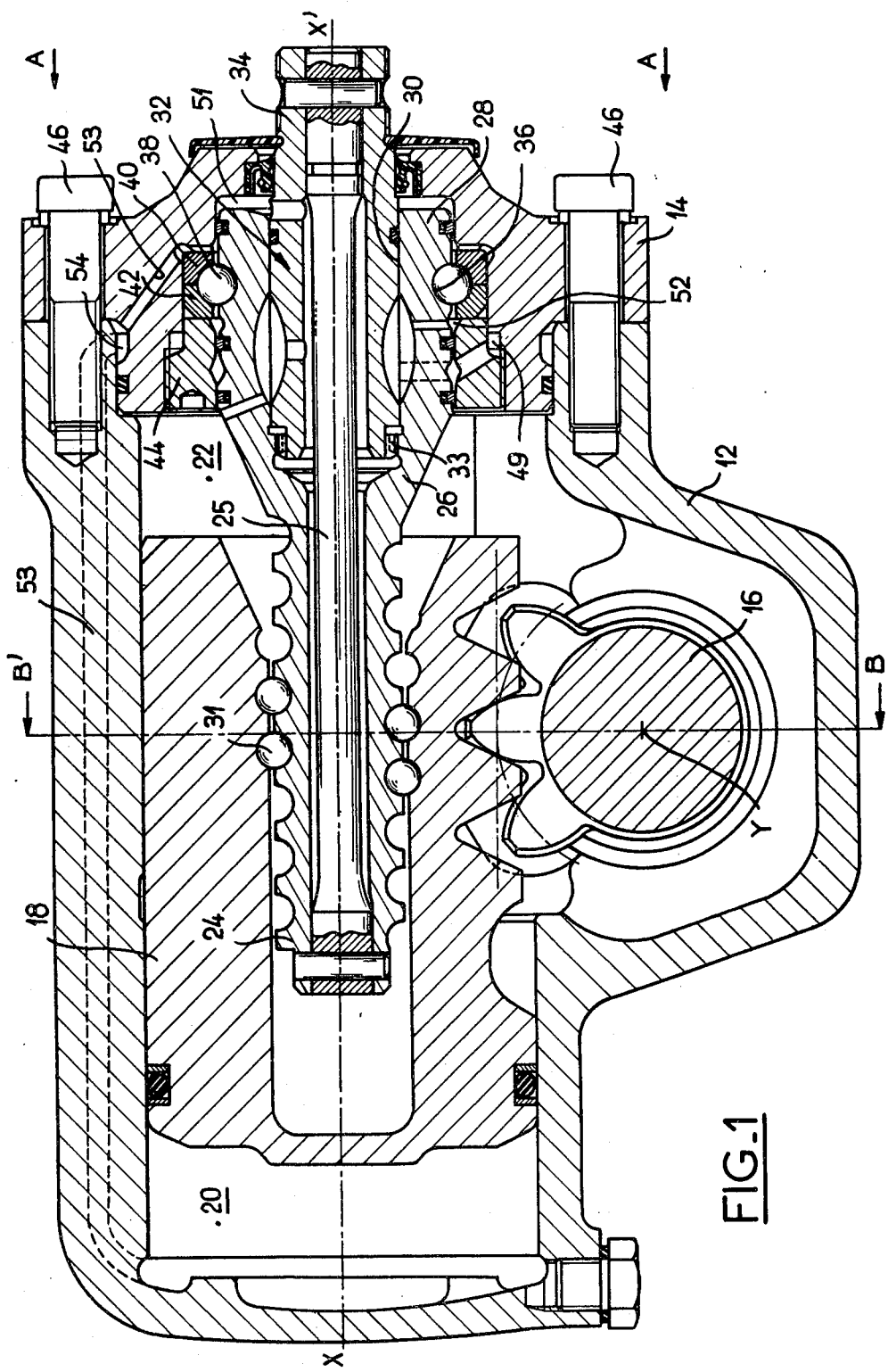
FIG. 1 represents a longitudinal section through a power steering mechanism embodying the invention.

As the Figures show, the power steering has a housing with a main body 12 and two covers 14, 15. A toothed sector 16 rotatably mounted in the main body is connected to the vehicle's steering gear (not shown), and a piston 18 in the body separates two pressure chambers 20, 22 in the body in a fluid-tight manner.

The piston 18 (FIGS. 1, 3) is equipped with teeth meshing with those of the toothed sector 16, so that every sliding motion of the piston 18 is associated with a rotational movement of the sector 16. The piston 18 contains a central recess into which projects one end 24 of a shaft 26, rotatable about an axis X—X′. The end 24 comprises a race for balls 31 movable in a complementary race in the piston 18, so that a screw and nut connection is formed, ball recycling means 29 being provided in the nut or piston 18. The other end 28 of the shaft 26 widens out and contains a bore 30 capable of receiving the rotor 32 of a pressure fluid distributor valve of the rotary type. The rotor 32 is integral with a rotary steering control member of which the free end 34 can rotate in response to movement of the vehicle's steering wheel by the driver. The end 28 of the shaft 26 defines the sleeve of the distributor valve which is thereby made in one piece with the shaft and contains various grooves and passages enabling fluid to flow along a path explained below. According to a particular feature of the invention, the end 28 of the shaft 26 contains a groove 36 forming an inner race for balls 38, which also cooperate with two complementary rings 40, 42 positioned radially and axially in the cover 14 by an annular nut 44. The groove 36, balls 38 and rings 40, 42 form a single ball thrust bearing to hold the shaft 26 in position in the housing. Although this is not indicated in FIG. 1, the inner and outer ball races are not circular, but have ogival cross-sections so as to give four-point contact between the balls 38 and their races. The end 24 of the shaft and the end 34 of the rotor are connected to respective ends of a spring forming a torsion bar 25. The rotor 32 and the wider end 28 of the shaft 26 comprise teeth 33 angularly spaced and capable of restricting the angle of rotation of the rotor relative to the sleeve, so that the vehicle's steering can be operated manually if the hydraulic power-assistance fails.

Figure 2:
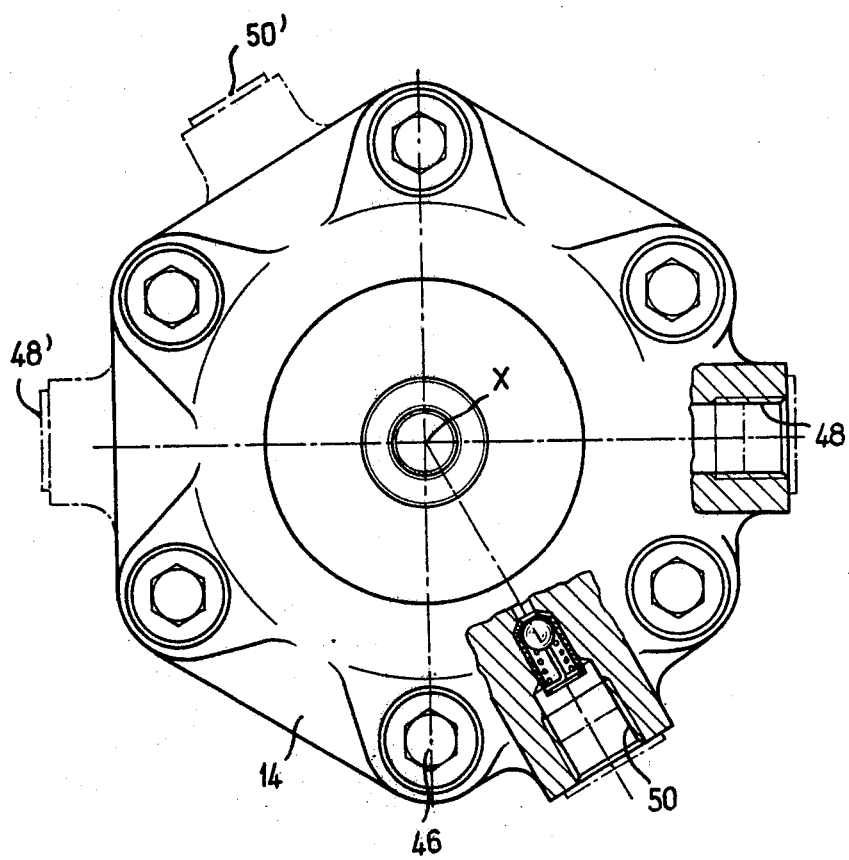
FIG. 2 is a side view in the direction A of the power steering mechanism illustrated in FIG. 1.

As may be judged from the drawings, the power steering mechanism embodying the invention is very compact, which greatly improves its potential and the ease with which it can be installed in the vehicle for which it is intended. To further facilitate installation, the embodiment herein described has the following feature, clearly illustrated in FIG. 2. As FIG. 2 shows, the valve cover 14 has an inlet orifice 48 and outlet orifice 50 which can be connected respectively to a hydraulic pump and a low-pressure fluid reservoir. The cover 14 is rigidly attached to the body of the housing 12 by six identical bolts 46 equispaced round the periphery of the cover, and the cover 14 can therefore be turned on the axis X—X′ according to the requirements of the designer of the vehicle. As a result of this particular feature of the cover, therefore, the two orifices 48, 50 can be directed, for example, into the positions shown at 48′, 50′. Also, the invention is not restricted to the device herein described, and where the power steering mechanism is associated with an auxiliary actuator it is possible to provide two nesting valve covers. In this case the cover 14 is associated with an annular cover containing two working orifices connected to the opposite pressure chambers of the actuator and to the chamber 22 or a groove 54 respectively. The annular cover also contains six apertures distributed round its periphery to receive the bolts 46, and it is inserted between the body of the housing 12 and the cover 14. In this way the working orifices, also, can be oriented relative to the body 12 and inlet and outlet orifices 48, 50 in accordance with the requirements of the designer.

The high-pressure orifice 48 and low-pressure orifice 50, although shown partly in the drawings, lead inside the housing into respective annular compartments 49, 51. These two compartments communicate by way of radial passages in the sleeve 28 and rotor 32 respectively with complementary flats and grooves formed in the sleeve and rotor by a technique which is well known in the art, and which will not be described in detail here. We will merely state that the upper groove in the sleeve 28 communicates with the pressure chamber 22, whereas the lower groove in the sleeve 28 communicates with a compartment 52 containing the ball bearing and communicating by way of a passage 53 with the annular groove 54, connected in turn by an axial duct 53 to the pressure chamber 20. To prevent any risk of leakage between the various connections, of course, an appropriate number of seals are provided, these being arranged as indicated in FIG. 1.

Figure 3:
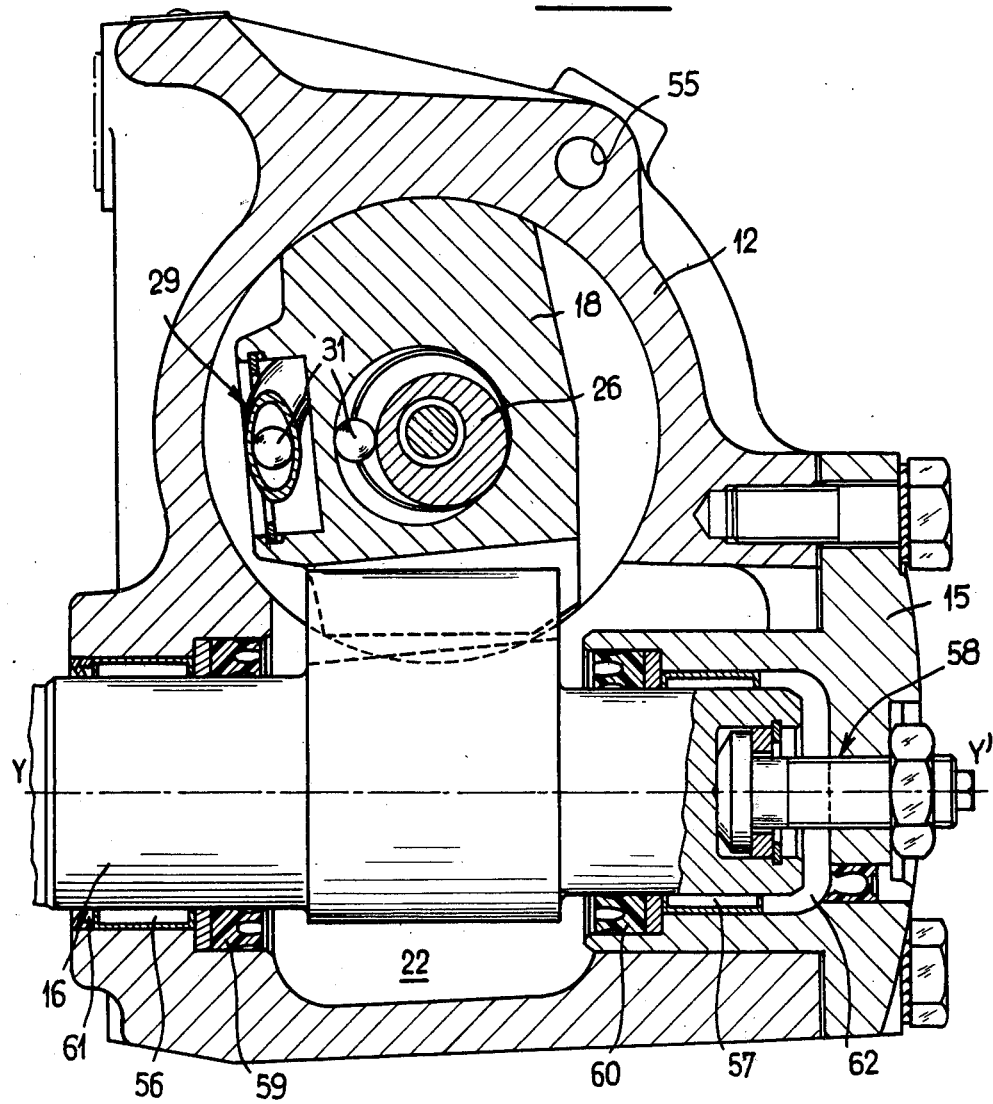
FIG. 3 is a section along a line B—B′ through the power steering mechanism illustrated in FIG. 1.

As FIG. 3 shows, the toothed sector 16 is rotatable relative to the axis Y—Y' by means of two needle bearings 56, 57 and an axial abutment connection 58. The chamber 22 is separated from the needle bearings 56, 57 by two seals 59, 60, and the bearings 56, 57 are lubricated by grease which is introduced into spaces 61, 62 for the life of the power steering mechanism. This arrangement replaces the low-pressure oil lubrication previously known, which demanded additional fluid passages in the body of the housing 12.

The operation of the power steering mechanism according to the invention, just described, will not be described here, since it is well known to those skilled in the art and substantially identical to the operation described in the above-mentioned U.S. Pat. No. 3,022,772 the two distributor valves being of the same rotary type and being largely similar in operation. As stated at the beginning of this description, the essential differences between the two power steering mechanisms arise from the structure of the elements, their number and their shape.

Figure 4:
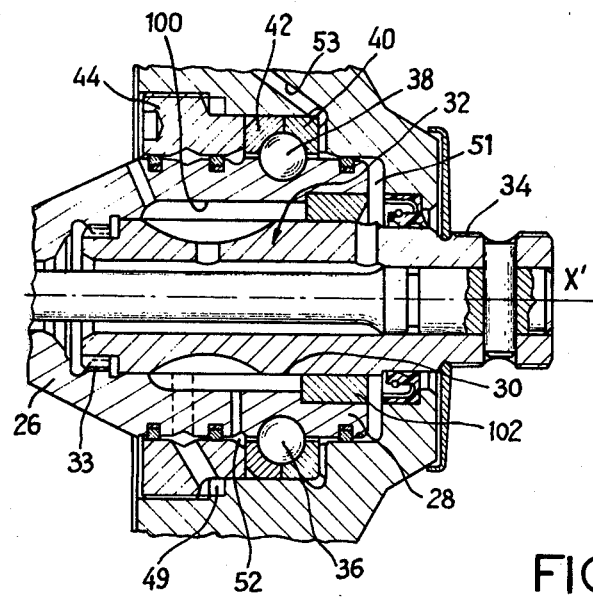
FIG. 4 is a partial longitudinal section through a variant of the invention, showing the sleeve of the distributor valve.
Figure 5:
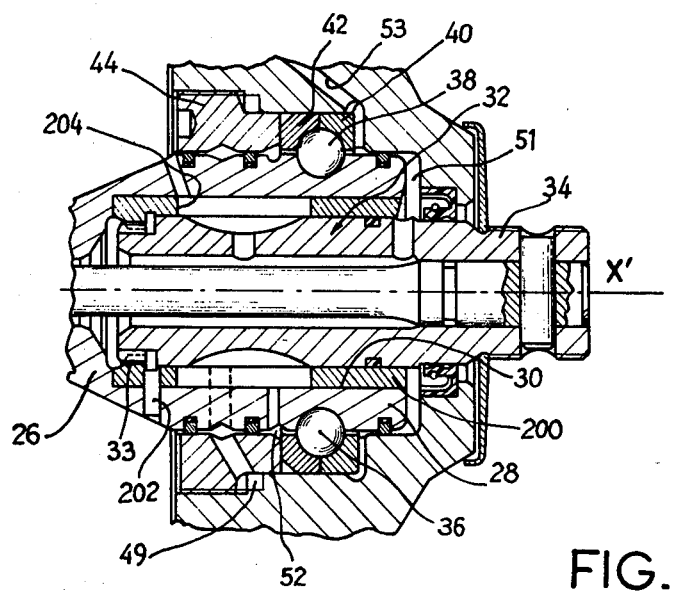
FIG. 5 is a partial longitudinal section through another variant of the invention, showing the sleeve of the distributor valve.

FIGS. 4 and 5 are partial views of power steering mechanisms of the same kind as that shown in FIG. 1, but with modifications to the sleeve. Elements already described with reference to FIG. 1 bear the same reference numerals and will not be described again.

The wider end 28 or sleeve of the distributor valve shown in FIG. 4 contains straight longitudinal grooves 100 of constant cross-section, of which the free end is closed by a ring 102 force-fitted into the end 28. This modified design makes it easy to produce the wider end by extrusion or cold-forging.

The sleeve shown in FIG. 5 is provided with a cylindrical bush 200 of machined or sintered material. The bush 200 is mounted in the bore 30 and receives the rotor 32. It is prevented from rotating relative to the end 28 by a cotter 202. The teeth 33 of the sleeve are mounted on the bush 200, which also comprises straight longitudinal slots 204 to allow fluid to flow in the distributor valve.

I claim:

1. A power steering mechanism comprising:
   a housing supporting a steering member and having a cover;
   a piston movably mounted within the housing to form pressure chambers and connecting with the steering member;
   a shaft coupled to said piston; and
   a pressure fluid distributor valve communicating with the pressure chambers; said pressure fluid distributor valve including a sleeve moving in unison with said shaft and a rotor disposed within said sleeve;
   said shaft and said rotor being connected to opposite ends of a torsion bar, said shaft forming a bore at one end for receiving said rotor and defining said sleeve at the bore; and
   said shaft being rotatably mounted in said housing by means of a ball thrust bearing having inner and outer ball races for supporting at least two balls therebetween, said ball thrust bearing being substantially defined by a groove in the sleeve which forms the inner ball race and a pair of rings held axially and radially in said housing cover which forms the outer ball race;
   said cover of the housing including a fluid inlet orifice and a fluid outlet orifice, the orifices leading respectively to an annular inlet compartment and an annular outlet compartment which enable fluid to flow through the distributor valve, said cover being attached to the housing by identical fixing means spaced around the periphery of said cover to permit variable angular orientation of the inlet and outlet orifices of said cover relative to the housing.

2. A power steering mechanism as claimed in claim 1, wherein the cross-sections of the inner and outer ball races are slightly ogival to give four-point contact between the balls and said inner and outer races.

3. A power steering mechanism as claimed in claim 2, characterized in that the sleeve includes a cylindrical bush with a longitudinal slot, said bush being mounted in the bore of said shaft, and the bush and rotor including angularly spaced teeth capable of restricting the angle of rotation of the rotor relative to the sleeve.

4. A power steering mechanism as claimed in claim 1, wherein the sleeve includes straight longitudinal grooves of constant cross-section having free ends and a ring force-fitted into, said shaft bore closes the free ends of said straight longitudinal grooves.

5. A power steering mechanism comprising:
   a housing supporting a steering member and having a cover engaged thereto;
   a piston movably mounted within the housing to form pressure chambers and connecting with the steering member;
   a shaft coupled to said piston; and
   a pressure fluid distributor valve communicating with the pressure chambers; said pressure fluid distributor valve including a sleeve moving in unison with said shaft and a rotor dispensed within said sleeve;
   said shaft and said rotor being connected to opposite ends of a torsion bar, said shaft forming a bore at one end for receiving said rotor and defining said sleeve at the bore;
   said shaft being rotatably mounted in said housing by means of a ball thrust bearing having inner and outer ball races for supporting at least two balls therebetween, said ball thrust bearing being substantially defined by a groove in the sleeve which forms the inner ball race and a pair of rings held axially within said housing cover by a nut, which is exposed to one of the pressure chambers, said nut engaging the sleeve and cooperating with said housing cover to substantially form a compartment which receives the ball thrust bearing, and said pair of rugs forming the outer ball race.

6. The power steering mechanism of claim 5 in which said nut cooperates with said housing cover to form passage means to communicate a high pressure orifice with said pressure fluid distributor valve.

* * * * *